US008998317B2

(12) United States Patent
Guo (10) Patent No.: US 8,998,317 B2
(45) Date of Patent: Apr. 7, 2015

(54) SUPPORT BASE FOR A CHILD SAFETY SEAT (71) Applicant: Wonderland Nurserygoods Company Limited, Central Hong Kong (HK)

(72) Inventor: Zheng Wen Guo, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 165 days.

(21) Appl. No.: 13/866,175

(22) Filed: Apr. 19, 2013

(65) Prior Publication Data

US 2013/0307305 A1    Nov. 21, 2013

(30) Foreign Application Priority Data

May 15, 2012 (CN) .......................... 2012 1 0150377

(51) Int. Cl.
*B60N 2/28* (2006.01)
(52) U.S. Cl.
CPC ............ *B60N 2/2821* (2013.01); *B60N 2/2887* (2013.01)
(58) Field of Classification Search
USPC .................................... 297/253, 256.16, 217.2
See application file for complete search history.

(56) References Cited

U.S. PATENT DOCUMENTS

| 7,328,946 | B2* | 2/2008 | Van Montfort et al. | ....... 297/253 |
| 8,100,474 | B2* | 1/2012 | Christ et al. | .................. 297/253 |
| 8,366,192 | B2* | 2/2013 | Clement et al. | ............... 297/253 |
| 8,454,089 | B2* | 6/2013 | Nett et al. | ...................... 297/253 |
| 2011/0233374 | A1 | 9/2011 | Clement et al. | |
| 2013/0026804 | A1* | 1/2013 | Guo | .......................... 297/250.1 |

FOREIGN PATENT DOCUMENTS

| EP | 0952032 | A2 | 10/1999 | |
| EP | 1369293 | A1 * | 12/2003 | ............... B60N 2/28 |
| EP | 0970842 | B1 | 9/2004 | |
| EP | 1900567 | A1 | 3/2008 | |
| EP | 1997673 | A2 * | 12/2008 | ............... B60N 2/28 |
| EP | 1714826 | B1 | 6/2009 | |

* cited by examiner

*Primary Examiner* — David R Dunn
*Assistant Examiner* — Jody Giacoman
(74) *Attorney, Agent, or Firm* — David I. Roche; Baker & McKenzie LLP (57) ABSTRACT

A support base for a child safety seat includes a shell body, an adjustable arm assembled with the shell body and having a rear end provided with a fastener operable to attach with an anchorage fixture of a vehicle, a safety lock, and a coupling portion assembled through an interior of the adjustable arm. The shell body is movable along the adjustable arm to adjust a distance between the fastener and a rear of the shell body. The safety lock is assembled with the shell body, and includes a latch operable to engage and disengage an opening of the adjustable arm. The latch is operable to lock the shell body with the adjustable arm, and a locking engagement of the fastener with the anchorage fixture causes a displacement of the coupling portion that pushes the latch to disengage from the opening for allowing displacement of the shell body toward the fastener.

16 Claims, 11 Drawing Sheets

SUPPORT BASE FOR A CHILD SAFETY SEAT

CROSS-REFERENCE TO RELATED APPLICATION

This application claims priority to Chinese Patent Application No. 201210150377.6 filed on May 15, 2012, which is incorporated herein by reference.

BACKGROUND

1. Field of the Invention

The present inventions relate to child safety seat assemblies, and more particularly to support bases for child safety seats.

2. Description of the Related Art

A child safety seat is usually required to seat a young child in a vehicle for protecting the child during crash collision. The child safety seat can be attached on the vehicle passenger's seat with the seatbelt of the vehicle. However, the use of the seatbelt for fastening the child safety seat may be inconvenient, and result in erroneous installation that fails to protect the child during collision.

Another approach proposes to incorporate a standardized latch system (i.e., ISOFIX standard) in a support base through which the child safety seat can be securely attached with an anchorage fixture provided in the vehicle. Conventionally, the latch system according to the ISOFIX standard can be extendable to facilitate the installation of the support base on the passenger's seat of the vehicle. However, it may happen that the latch system undesirably moves or retracts during installation owing to frictional contact between the bottom of the support base and the surface of the passenger's seat.

Therefore, there is a need for an improved structure that can address at least the aforementioned issues.

SUMMARY

The present application describes a support base for a child safety seat that can be convenient to operate, and safe in use. In one embodiment, the support base can include a shell body, an adjustable arm assembled with the shell body and having a rear end provided with a fastener operable to attach with an anchorage fixture of a vehicle, a safety lock, and a coupling portion assembled through an interior of the adjustable arm and operable to interact with the fastener. The shell body is movable along the adjustable arm to adjust a distance between the fastener and a rear of the shell body. The safety lock is assembled with the shell body, and includes a latch operable to engage and disengage an opening of the adjustable arm. The latch is operable to lock the shell body with the adjustable arm, and a locking engagement of the fastener with the anchorage fixture causes a displacement of the coupling portion that pushes the latch to disengage from the opening for allowing displacement of the shell body relative to the adjustable arm toward the fastener.

DETAILED DESCRIPTION OF THE EMBODIMENTS

Figure 1:
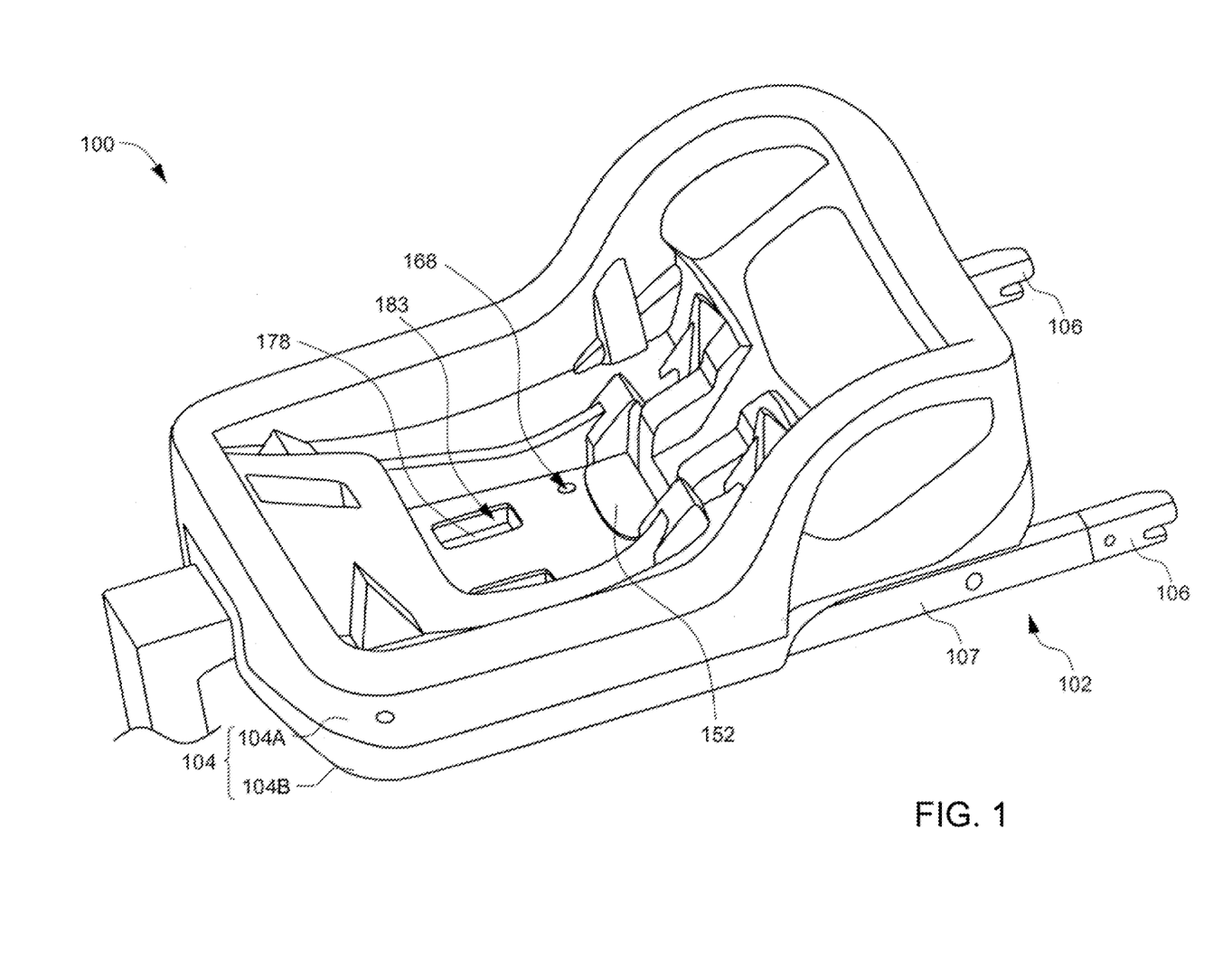
FIG. 1 is a schematic view illustrating an embodiment of a support base for a child safety seat.

FIG. 1 is a schematic view illustrating an embodiment of a support base 100 for a child safety seat. The support base 100 can include a shell body 104, and two adjustable arms 102 assembled with the shell body 104 and having distal ends respectively provided with fasteners 106. The shell body 104 can be formed from the assembly of upper and lower housing parts 104A and 104B. The upper housing part 104A can have an upper surface adapted to detachably fasten with an underside of a child safety seat (not shown) to provide support. The lower housing part 104B can be assembled with the adjustable arms 102. The two fasteners 106 can be respectively assembled with the adjustable arms 102 at the rear of the shell body 104. The fasteners 106 can be operable to attach and detach the support base 100 with respect to an anchorage fixture 200 of a vehicle (as better shown in FIG. 7).

Figure 2:
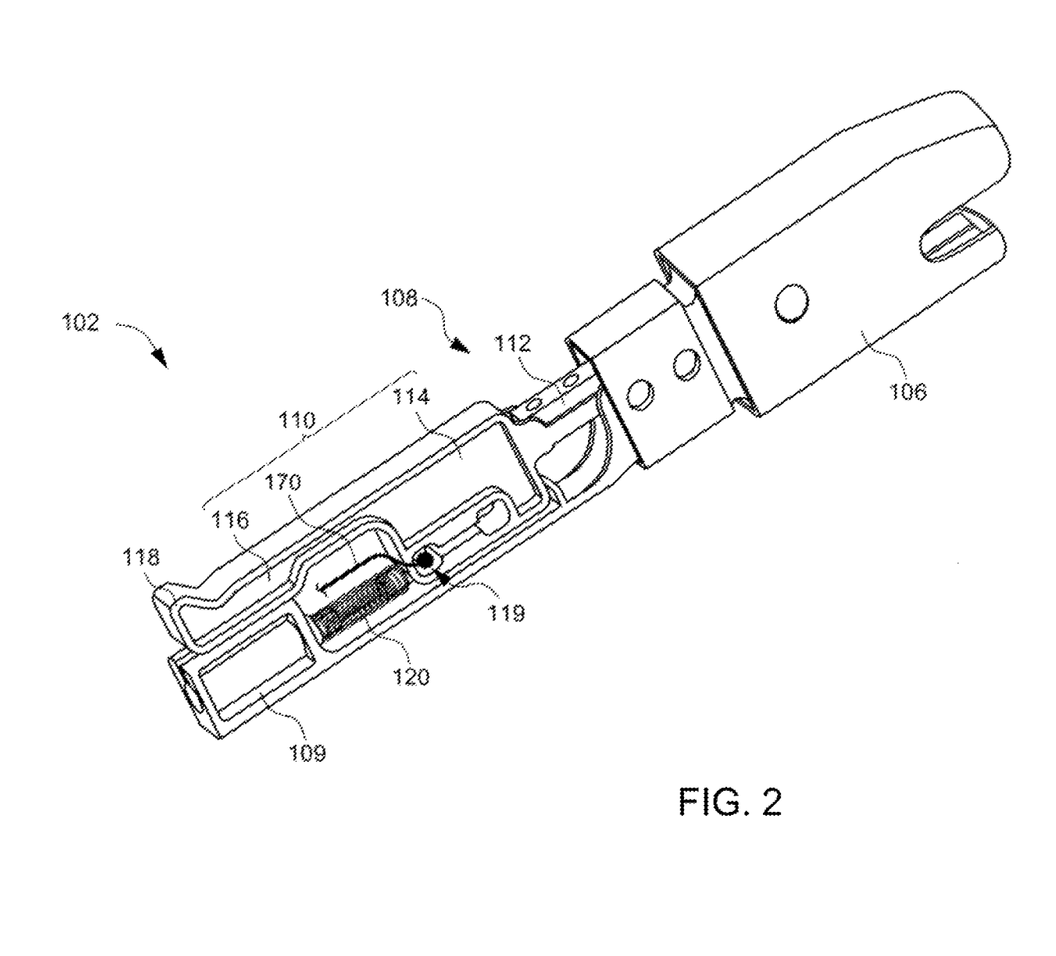
FIG. 2 is a schematic view illustrating an internal construction of one adjustable arm of the support base.

The two adjustable arms 102 may be similar in construction. FIG. 2 is a schematic view illustrating an internal construction of one of the two adjustable arms 102. The adjustable arm 102 can include an outer casing 107 (better shown in FIG. 1 and omitted in FIG. 2), a coupling portion 108 and a link member 109. The coupling portion 108 and the link member 109 can be assembled inside the outer casing 107, the coupling portion 108 being disposed above the link member 109. In one embodiment, the coupling portion 108 can include a first and a second coupling part 110 and 112 assembled with each other. With reference to FIG. 2, a left end of the second coupling part 112 can be affixed with the first coupling part 110, and a right end of the second coupling part 112 can be installed through the associated fastener 106 (as better shown in FIG. 5). In other embodiments, the first and second coupling parts 110 and 112 may also be formed in one integral body. The first coupling part 110 can include a body 114, and an elongated extension 116 projecting at a side opposite to that of the fastener 106. An upper surface of the elongated extension 116 can include an upward protrusion 118. The body 114 can include a hole 119 through which a distal end of a transmission cable 170 can be securely anchored. A spring 120 can be disposed in a gap below the elongated extension 116, and can be respectively connected with the body 114 and the link member 109.

Figure 3:
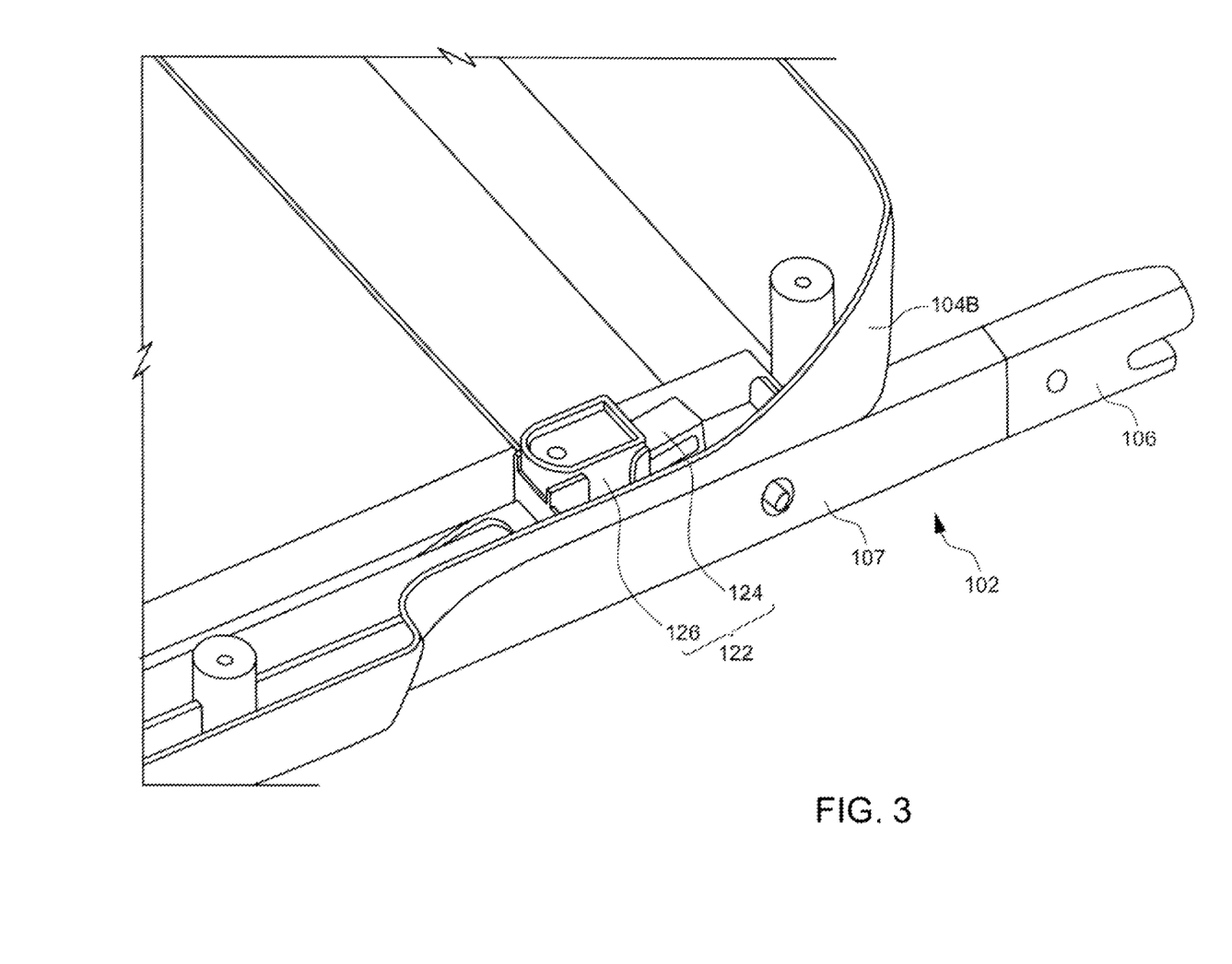
FIG. 3 is a schematic view illustrating an internal construction of a lower housing part of the support base.

FIG. 3 is a schematic view illustrating an internal construction of the lower housing part 104B. The lower housing part 104B can extend at least partially above the two adjustable arms 102. Left and right sides of the lower housing part 104B can be respectively provided with two safety locks 122 operable to lock the adjustable arms 102 in place so as to prevent accidental extension and retraction thereof. The two safety locks 122 are similar in construction, and only of them is shown in FIG. 3 for clarity). The safety lock 122 can include a latch 124 and a cap 126. The cap 126 can be arranged so as to overlap with an upper side of the latch 124.

Figure 4:
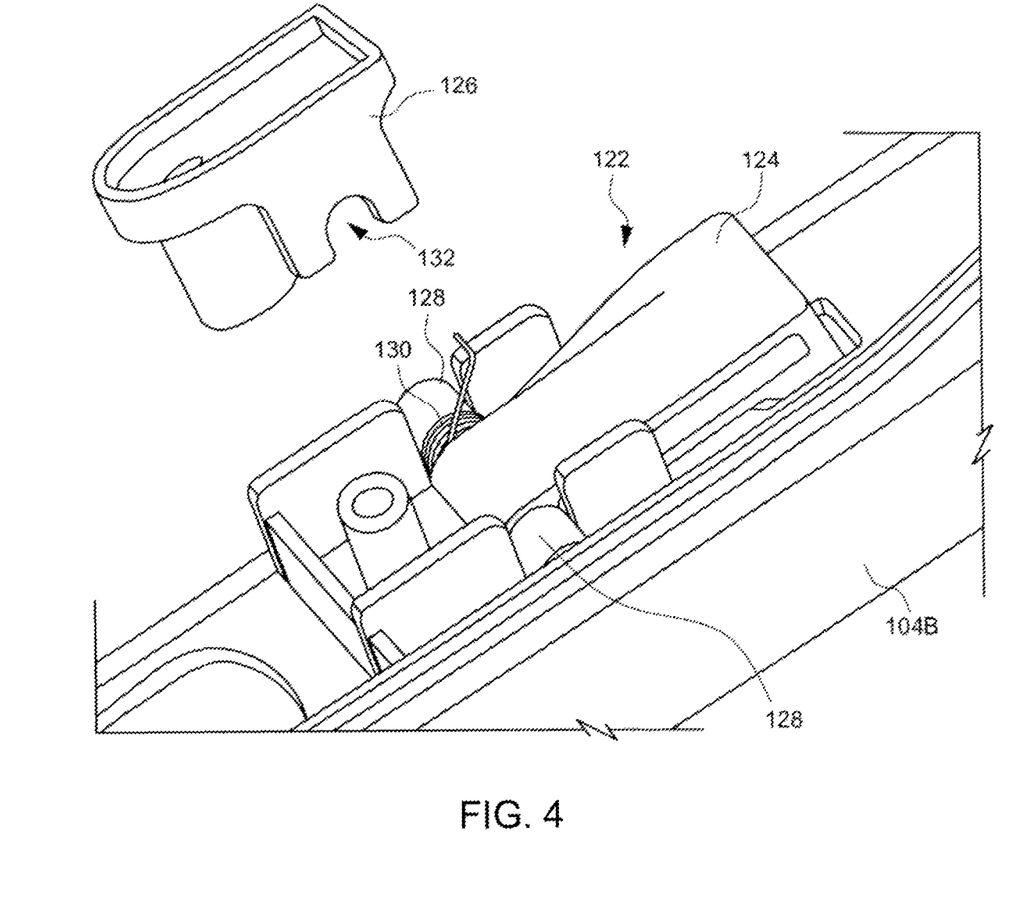
FIG. 4 is a schematic view illustrating the construction of a safety lock.

FIG. 4 is a schematic view illustrating the safety lock 122 with the cap 126 in a disassembled state. Each of two side surfaces of the latch 124 can respectively include a protruding shaft portion 128 through which the latch 124 can be pivotally connected with the lower housing part 104B. The cap 126 can have left and right sidewalls having lower edges respectively provided with notches 132. When the cap 126 is assembled with the lower housing part 104B, the shaft portions 128 can be respectively received in the notches 132. Moreover, the safety lock 122 can include a torsion spring 130 that wraps around one of the two shaft portions 128. The torsion spring 130 may apply a biasing force to rotate the latch 124 for restoring its initial position.

Figure 5:
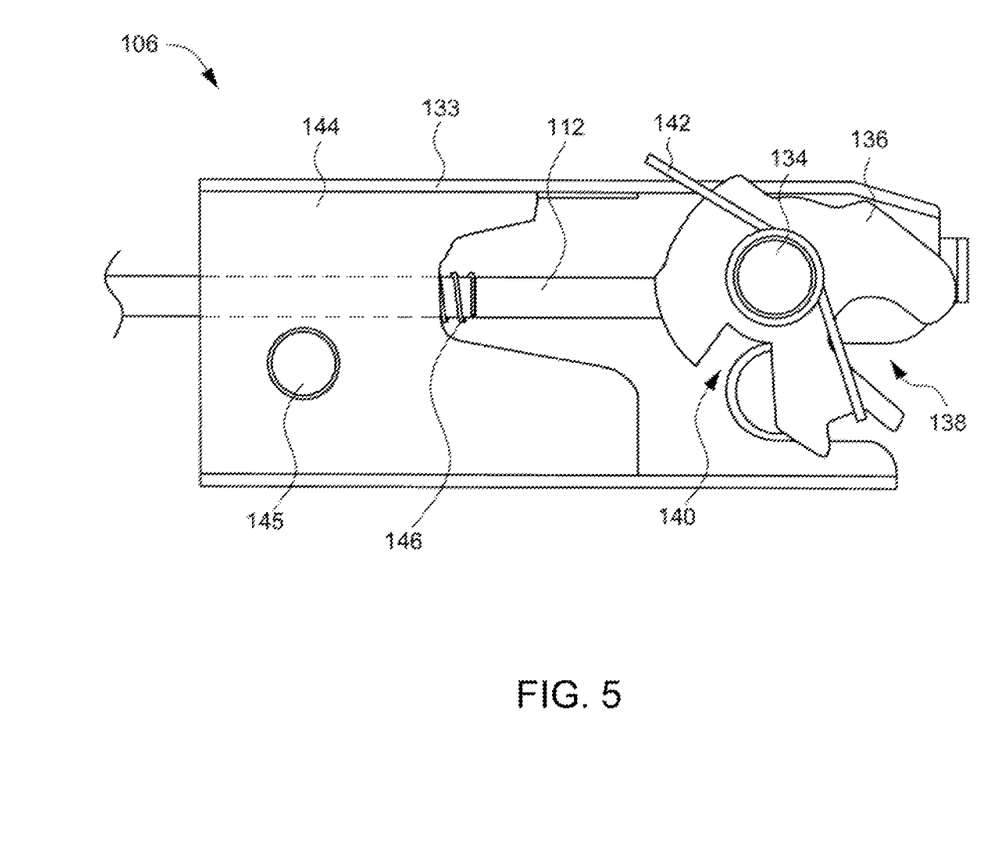
FIG. 5 is a schematic view illustrating the construction of one fastener that is assembled with one adjustable arm, the fastener being shown in a release state.

FIG. 5 is a schematic view illustrating an internal construction of one fastener 106 in a release state. The fastener 106 can include an outer casing 133, a shaft 134, a tongue 136 and a frame 144. The shaft 134 can be pivotally connected with the outer casing 133. The tongue 136 can be affixed with the shaft 134, and can an outer peripheral edge provided with a first and a second slot 138 and 140 spaced apart from each other. The tongue 136 can be disposed through an interior of the outer casing 133, and can be pivotally connected with the outer casing 133 via the shaft 134. A torsion spring 142 can wrap around the shaft 134, and can apply a biasing force to rotate the tongue 136 for restoring its initial position. The frame 144 can be affixed inside the outer casing 133 via a fixing member 145 (such as a rivet). The second coupling part 112 can be arranged through an interior of the frame 144, and a spring 146 may be assembled between the second coupling part 112 and the frame 144. When the fastener 106 unlocks from the anchorage fixture 200, the second coupling part 112 can extend outward from the frame 144 so as to abut against the outer peripheral edge of the tongue 136, while the spring 146 is in a compressed state.

Figure 6:
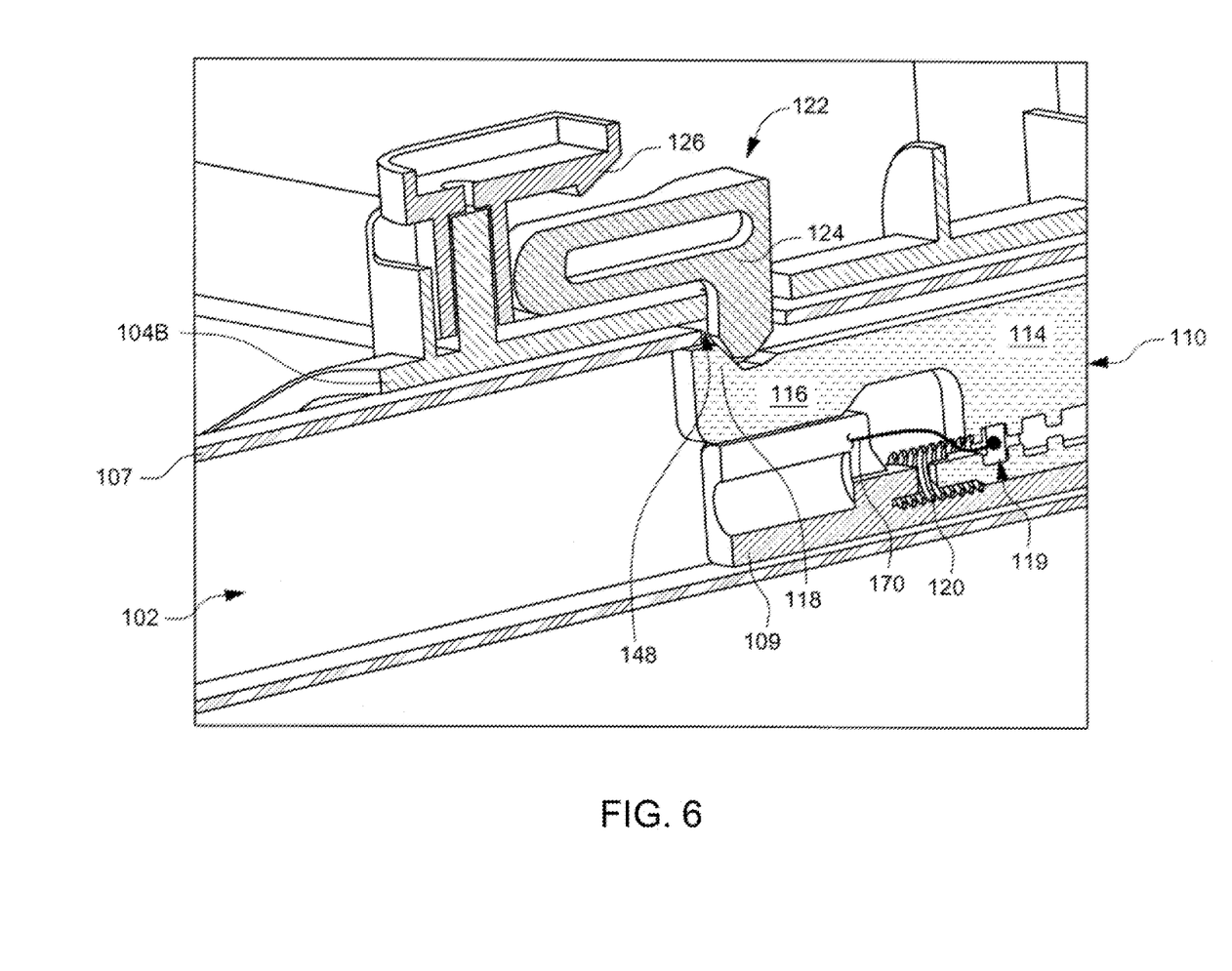
FIG. 6 is a partial cross-sectional view illustrating the safety lock engaged with the adjustable arm associated therewith.

FIG. 6 is a partial cross-sectional view illustrating the safety lock 122 engaged with the adjustable arm 102 associated therewith. A portion of the adjustable arm 102 can have an upper surface provided with an opening 148. When the fastener 106 is in the release state, a caregiver can displace the shell body 104 toward a front end of the adjustable arm 102 that is opposite to the side of the fastener 106, until the latch 124 engages with the opening 148 of the adjustable arm 102. The shell body 104 can be thereby securely locked in position with the adjustable arm 102. Unless the fastener 106 is in locking engagement with the anchorage fixture 200 of the vehicle, the shell body 104 can be blocked from moving relative to the adjustable arms 102 toward the fasteners 106. As a result, undesirable obstruction to the attachment of the fasteners 106 caused by inadvertent displacement of the shell body 104 can be prevented.

Figure 7:
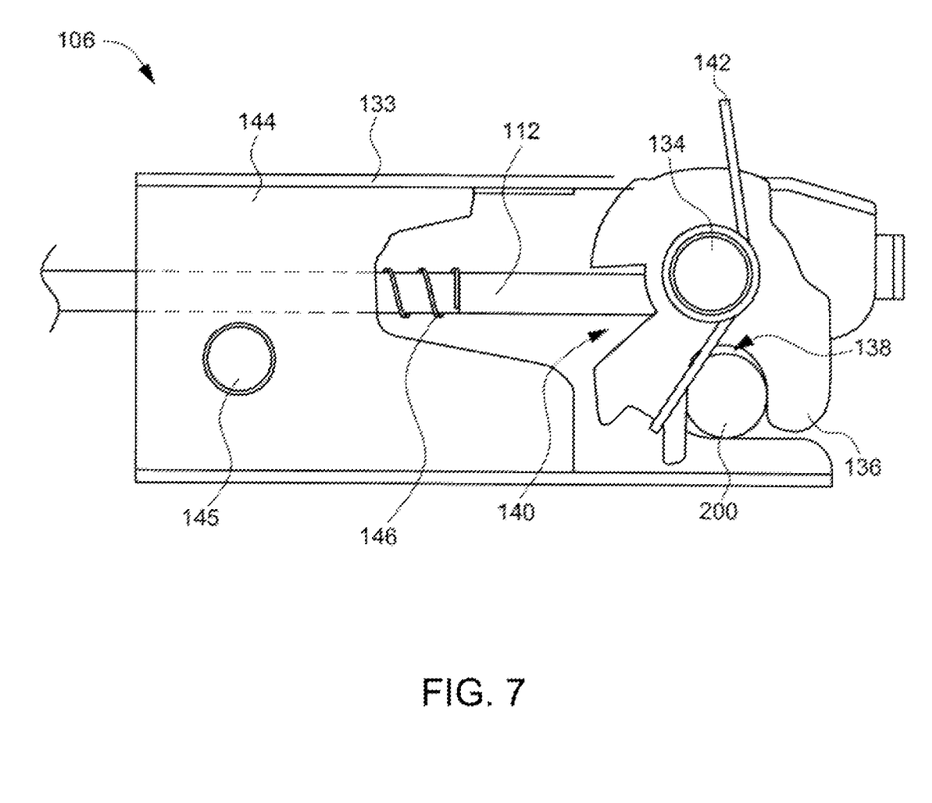
FIG. 7 is a schematic view illustrating the fastener of one adjustable arm in a locking state.

FIG. 7 is a schematic view illustrating an internal construction of one fastener 106 in a locking state. For attaching the support base 100 with the anchorage fixture 200 in the vehicle, the anchorage fixture 200 can be engaged with the first slot 138 of the tongue 136. While the anchorage fixture 200 is inserting into the first slot 138, the tongue 136 can be pushed to rotate in a direction to have the second slot 140 facing the second coupling part 112. As a result, the second coupling part 112 can be pushed in a direction away from the shaft 134, which loads the springs 120 and 146. Once the second slot 140 becomes aligned with the second coupling part 112, the biasing action from the springs 120 and 146 can push the second coupling part 112 along a lengthwise axis to engage with the second slot 140 and block rotation of the tongue 136.

Figure 8:
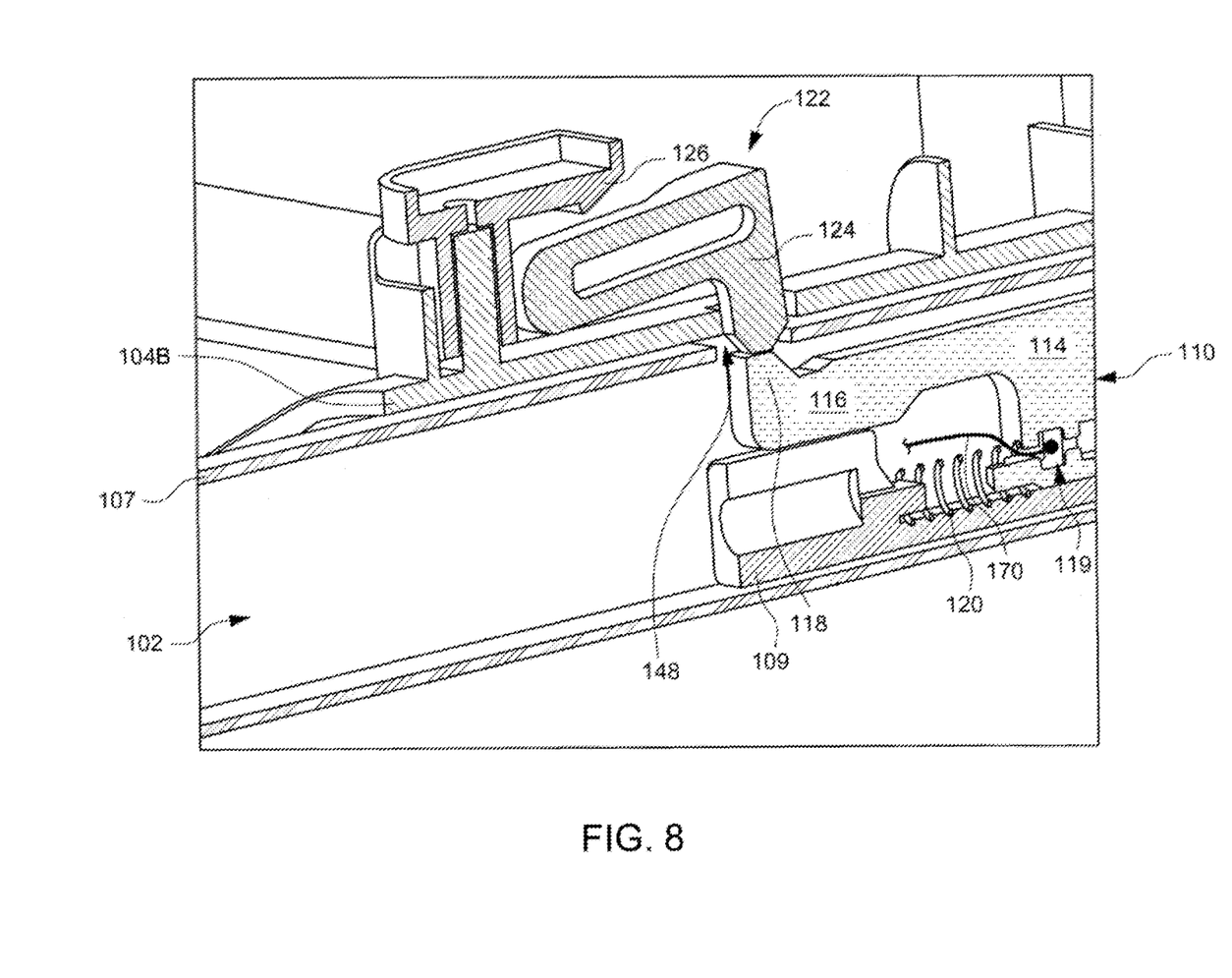
FIG. 8 is a partial cross-sectional view illustrating the safety lock disengaged from one adjustable arm.

FIG. 8 is a partial cross-sectional view illustrating the safety lock 122 disengaged from the adjustable arm 102. While it is moving toward the side of the fastener 106 for engaging the second slot 140, the second coupling part 112 can also drive the first coupling part 110 to move in the same direction. As a result, the protrusion 118 of the first coupling part 110 can push the latch 124 upward to disengage from the opening 148 of the adjustable arm 102. More specifically, the latch 124 when engaged through the opening 148 may be adjacent to an angled sidewall surface of the opening 148. Accordingly, the protrusion 118 only needs to slightly push the latch 124 upward so that the tip of the latch 124 is in contact or faces angled sidewall surface of the opening 148 for unlocking the safety lock 122. Once the latch 124 has disengaged from the opening 148, the position of the shell body 104 relative to the adjustable arms 102 can be movably adjusted. While the shell body 104 is sliding relative to the adjustable arms 102, the latch 124 can be in sliding contact with an outer surface of the adjustable arm 102.

Figure 9:
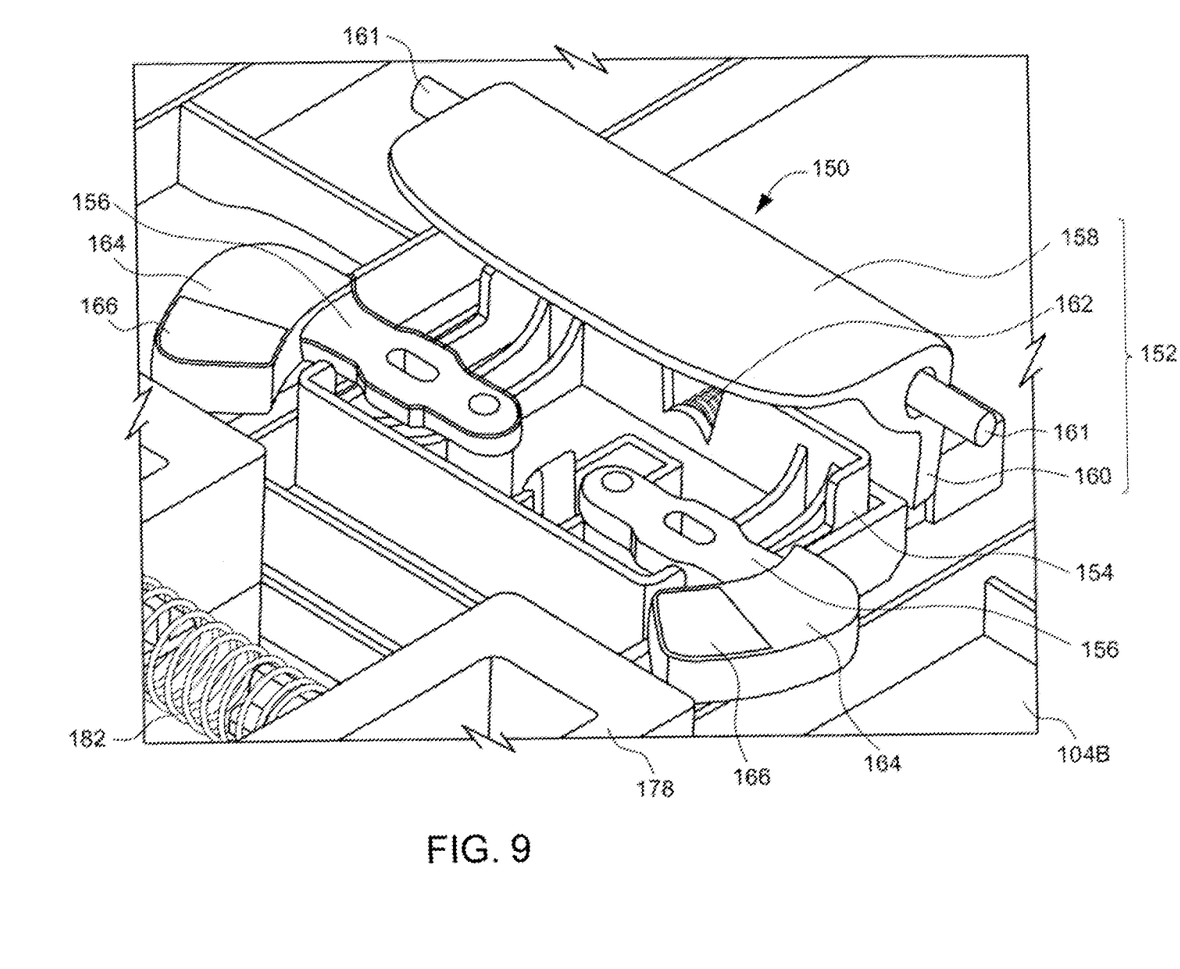
FIG. 9 is a schematic view illustrating a first control mechanism arranged in the shell body of the support base.

FIG. 9 is a schematic view illustrating a first control mechanism 150 arranged in the shell body 104. The first control mechanism 150 can include an actuator 152, a mount frame 154 and two indicator members 156. The actuator 152 can include an operating portion 158 that extends along a lengthwise axis of the shell body 104, and a driving portion 160 that extends perpendicular to the operating portion 158. Two side edges of the driving portion 160 can respectively include protruding shafts 161 that are coaxial with each other and extend transversally relative to the shell body 104. The actuator 152 can be pivotally connected with the lower housing part 104B via the shafts 161. The mount frame 154 can be movably assembled with the lower housing part 104B. A spring 162 can be connected with a rear of the mount frame 154 and the lower housing part 104B, and can be operable to bias the mount frame 154 to an initial position. Each of the indicator members 156 can be pivotally connected with the mount frame 154 about an axis extending substantially vertical, and can have an upper surface having first and second regions 164 and 166 of different colors. The upper housing part 104A can have two openings 168 through which the first or second regions 164 and 166 of the indicator members 156 can be exposed to indicate the attachment state of the support base 100. For example, when the support base 100 is attached with the anchorage fixture 200, only the first regions 164 of the indicator members 156 can be exposed and visible through the openings 168, whereas the second regions 166 are concealed.

Figure 10:
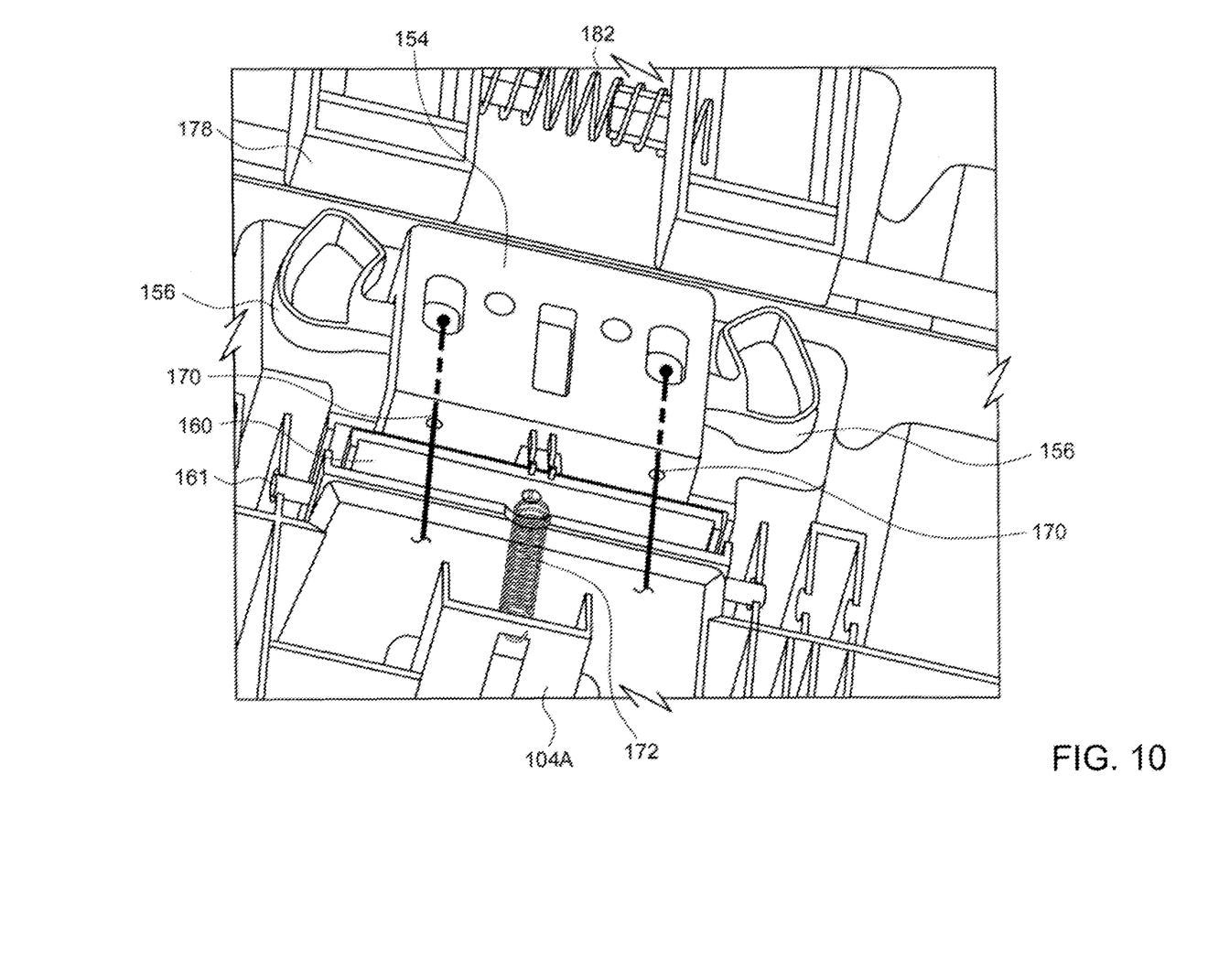
FIG. 10 is a schematic view illustrating an underside of the first control mechanism.

FIG. 10 is a schematic view illustrating an underside of the first control mechanism 150. The first control mechanism 150 can further include two elongated transmission cables 170, e.g., formed by wire or cord segments. Each of the transmission cables 170 can have a first end affixed with the mount frame 154, and a second end anchored through the hole 119 of the body 114 of the first coupling part 110 (as better shown in FIG. 2). A spring 172 can be connected with the upper housing part 104A and a lower end of the operating portion 160 of the actuator 152. The spring 172 can be operable to bias the actuator 152 to an initial position.

Reference is made to FIGS. 1, 9 and 10 to describe exemplary operation of the support base 100. When the support base 100 is to be detached from the anchorage fixture 200, a caregiver can grasp the operating portion 158 and rotate the actuator 152 (e.g., clockwise). The rotating actuator 152 then can push against the rear of the mount frame 154, which causes the mount frame 154 to displace toward the front of the shell body 104. The sliding mount frame 154 can drive the two indicator members 156 to rotate in opposite directions (e.g., clockwise and anticlockwise), and pull the first and second coupling parts 110 and 112 forward via the transmission cable 170. As a result, the second coupling part 112 can disengage from the second slot 140 of the tongue 136, and the displacements of the first and second coupling parts 110 and 112 respectively compress the springs 120 and 146. Once the second coupling part 112 has disengaged from the second slot 140, the tongue 136 can be urged by the torsion spring 142 to rotate (e.g., anticlockwise) and push the anchorage fixture 200 out of the first slot 138. Accordingly, ejection of the anchorage fixture 200 out of the first slot 138 can be facilitated. The unlocked support base 100 then can be removed from the passenger's seat of the vehicle, and the indicator members 156 can turn to have the second regions 166 displayed through the openings 168 indicating that the support base 100 is released from the anchorage fixture 200.

Figure 11:
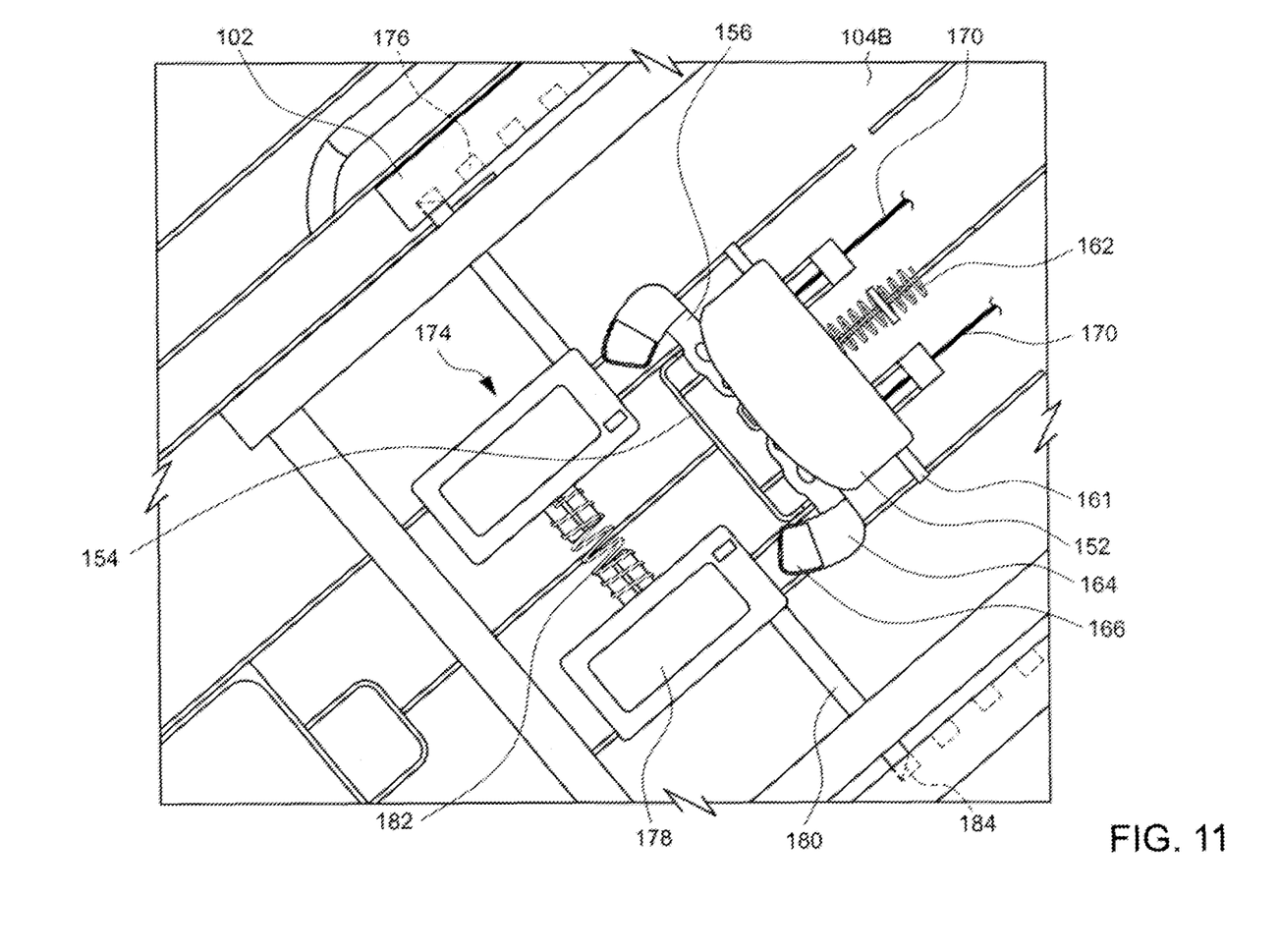
FIG. 11 is a schematic view illustrating the assembly of a second control mechanism in the lower housing part of the shell body.

FIG. 11 is a schematic view illustrating the assembly of a second control mechanism 174 in the lower housing part 104B of the shell body 104. Each of the adjustable arms 102 can have a sidewall through which are formed a plurality of locking holes 176 that define multiple lock positions of the shell body 104. The second control mechanism 174 can include two buttons 178, two lock rods 180 extending transversally, and a spring 182. The buttons 178 can be movably assembled with the lower housing part 104B, and can be visible through two openings 183 (better shown in FIG. 1) formed through an upper surface of the upper housing part 104A. The spring 182 can be arranged between and connected with the two buttons 178, and can be operable to bias the buttons 178 to their initial positions. Each lock rod 180 can have a first end affixed with one corresponding button 178, and an opposite second end that is formed with an angled surface 184 and is movable to engage with and disengage from any of the locking holes 176 of one adjustable arm 102 associated therewith.

When the caregiver displaces the shell body 104 toward the rear of the adjustable arms 102 (i.e., toward the fasteners 106) while the lock rods 180 are engaged with two locking holes 176, the angled surfaces 184 of the lock rods 180 can push against facing sidewalls of the corresponding locking holes 176, which cause the lock rods 180 to self disengage from the locking holes 176 without the need of actuating the buttons 178.

When the shell body 104 is to be adjusted toward the front of the adjustable arms 102, the buttons 178 can be actuated toward each other to compress the spring 182, which drives the lock rods 180 to disengage from the locking holes 176. The unlocked shell body 104 then can be desirably displaced toward the front of the adjustable arms 102.

It is worth noting that the implementation of the structures described herein is not limited to support bases. In other embodiments, the same structures may be applied in child safety seats that may be directly installed on the passenger's seat of a vehicle without the need of a support base.

At least one advantage of the structures described herein includes the ability to provide a safety lock that can securely hold the shell body of the support base away from the fasteners (e.g., when the shell body is adjusted forward to the greatest distance away from the fasteners). Accordingly, inadvertent rearward movement of the shell body toward the seatback of the passenger's seat can be prevented for facilitating the installation of the support base.

Realization of the support base for a child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A support base for a child safety seat, comprising:
a shell body;
an adjustable arm assembled with the shell body and having an opening, a rear end of the adjustable arm being provided with a fastener operable to attach with an anchorage fixture of a vehicle, and the shell body being movable along the adjustable arm to adjust a distance between the fastener and a rear of the shell body;
a safety lock assembled with the shell body and including a latch operable to engage and disengage the opening; and
a coupling portion assembled through an interior of the adjustable arm and operable to interact with the fastener;
wherein the latch is operable to engage with the opening to lock the shell body with the adjustable arm, and a locking engagement of the fastener with the anchorage fixture causes a displacement of the coupling portion that pushes the latch to disengage from the opening for allowing displacement of the shell body relative to the adjustable arm toward the fastener.

2. The support base according to claim 1, being adapted to detachably assemble with an underside of a child safety seat.

3. The support base according to claim 1, wherein the latch is pivotally connected with the shell body.

4. The support base according to claim 1, wherein the fastener includes a pivotal tongue operable to engage with the anchorage fixture and having an outer peripheral edge provided with a slot, the coupling portion being in contact with the outer peripheral edge when the tongue is not engaged with the anchorage fixture, and the locking engagement of the anchorage fixture with the tongue causes the tongue to rotate until the coupling portion becomes engaged with the slot.

5. The support base according to claim 4, wherein the fastener further includes a pivot shaft about which the tongue is pivotally assembled, and a torsion spring assembled around the pivot shaft and operable to bias the tongue in a direction for disengaging the tongue from the anchorage fixture.

6. The support base according to claim 4, wherein the fastener further includes a mount frame through which is assembled the coupling portion, a spring being connected with the coupling portion and the mount frame, the spring being compressed by the coupling portion when the coupling portion is in contact with the outer peripheral edge of the tongue, and the spring being operable to bias the coupling portion toward the tongue.

7. The support base according to claim 4, wherein the tongue further includes another slot in which the anchorage fixture is engaged to attach the support base.

8. The support base according to claim 1, further including a link member assembled through the interior of the adjustable arm and connected with the fastener, a spring being connected between the link member and the coupling portion.

9. The support base according to claim 5, wherein the shell body further includes a first control mechanism operatively connected with the coupling portion, the first control mechanism being operable to release the engagement of the coupling portion with the slot of the tongue, such that the torsion spring biases the tongue in rotation for disengaging the anchorage fixture from the tongue.

10. The support base according to claim 9, wherein the first control mechanism includes:

an actuator pivotally assembled with the shell body;
a mount frame movably assembled with the shell body;
an indicator member pivotally connected with mount frame; and
a transmission cable having a first end connected with the mount frame, and a second end connected with the coupling portion,
wherein the actuator is operable to push the mount frame in movement, thereby pulling on the transmission cable and causing rotation of the indicator member relative to the mount frame.

11. The support base according to claim 10, wherein the shell body has an upper surface provided with an opening through which either of a first and a second region of the indicator member is exposed to indicate whether the support base is attached with the anchorage fixture.

12. The support base according to claim 1, wherein the shell body further includes a second control mechanism operable to lock the shell body at any of a plurality of predetermined positions along the adjustable arm.

13. The support base according to claim 12, wherein the latch engages the opening when the second control mechanism locks the shell body at a most distant one of the predetermined positions from the fastener.

14. The support base according to claim 12, wherein the second control mechanism includes a button movably assembled with the shell body, a lock rod connected with the button and operable to lock with any of a plurality of locking holes associated with the predetermined positions, and a spring connected with the button.

15. The support base according to claim 14, wherein an end of the lock rod engaging with the locking holes has an angled surface.

16. The support base according to claim 1, wherein the latch is in sliding contact with an outer surface of the adjustable arm when the shell body moves relative to the adjustable arm.

* * * * *